United States Patent
Lehnhardt et al.

(10) Patent No.: US 10,635,652 B2
(45) Date of Patent: Apr. 28, 2020

(54) METHOD FOR QUERYING A DATABASE

(71) Applicant: COMPUGROUP MEDICAL SE, Koblenz (DE)

(72) Inventors: Jan Lehnhardt, Koblenz (DE); Tobias Rho, Bonn (DE)

(73) Assignee: COMPUGROUP MEDICAL SE, Koblenz (DE)

( * ) Notice: Subject to any disclaimer, the term of this patent is extended or adjusted under 35 U.S.C. 154(b) by 137 days.

(21) Appl. No.: 15/441,403

(22) Filed: Feb. 24, 2017

(65) Prior Publication Data

US 2018/0173741 A1 Jun. 21, 2018

(30) Foreign Application Priority Data

Dec. 16, 2016 (EP) .................................... 16204660

(51) Int. Cl.
*H04L 29/00* (2006.01)
*G06F 16/23* (2019.01)
(Continued)

(52) U.S. Cl.
CPC ...... *G06F 16/2329* (2019.01); *G06F 16/2246* (2019.01); *G06F 16/2308* (2019.01);
(Continued)

(58) Field of Classification Search
CPC ......... G06F 17/30339; G06F 17/30592; G06F 17/30306; G06F 17/30654; G06F 17/30017
See application file for complete search history.

(56) References Cited

U.S. PATENT DOCUMENTS

| 5,994,780 A | 8/1999 | Chase et al. |
| 6,148,342 A | 11/2000 | Ho |

(Continued)

FOREIGN PATENT DOCUMENTS

| EP | 2731044 A1 | 5/2014 |
| WO | 03/021484 A2 | 3/2003 |

OTHER PUBLICATIONS

Final Office Action dated Jan. 29, 2018 for U.S. Appl. No. 15/286,638, 12 pages.
(Continued)

*Primary Examiner* — Ghazal B Shehni
(74) *Attorney, Agent, or Firm* — J. Clinton Wimbish; Nexsen Pruet, PLLC

(57) ABSTRACT

The invention relates to method for querying a database stored on a server network, the server being coupled to the client computer via the network, wherein the database comprises a relation, the relation comprising data items, the data items forming a partially ordered set in the relation, the method comprising receiving at the client a request for a data operation on a desired data item, the method comprising
a. determining as an initial version number of the data items a currently valid version number of the data items,
b. traversing, starting from an initial data item of the data items, the relation by repeatedly requesting by the client current data items from the database in order with respect to the partial order until the position of the desired data item or the desired data item itself is identified in the partially ordered set, wherein for each requesting the currently valid version number of the data items of the partially ordered set is determined, the traversing being aborted in case the currently valid version number is different from the initial version number, (Continued)

c. in case the traversing was completed, performing the data operation on the identified position of the desired data item or the desired data item itself, d. upon performing the data operation updating the currently valid version number to a new version number.

18 Claims, 4 Drawing Sheets

(51) Int. Cl.
    *G06F 16/242*    (2019.01)
    *G06F 16/2452*    (2019.01)
    *G06F 16/2455*    (2019.01)
    *G06F 21/62*    (2013.01)
    *G06F 16/22*    (2019.01)
    *H04L 29/06*    (2006.01)

(52) U.S. Cl.
    CPC ...... *G06F 16/2365* (2019.01); *G06F 16/2443* (2019.01); *G06F 16/2452* (2019.01); *G06F 16/2455* (2019.01); *G06F 21/6218* (2013.01); *G06F 21/6227* (2013.01); *H04L 63/061* (2013.01)

(56) References Cited

U.S. PATENT DOCUMENTS

| | | | |
|---|---|---|---|
| 6,785,810 | B1 | 8/2004 | Lirov et al. |
| 7,058,622 | B1 | 6/2006 | Tedesco |
| 8,909,677 | B1 * | 12/2014 | Aguilera ........... G06F 17/30327 707/797 |
| 9,495,555 | B2 | 11/2016 | Spalka et al. |
| 9,558,228 | B2 | 1/2017 | Spalka et al. |
| 2002/0174355 | A1 | 11/2002 | Rajasekaran et al. |
| 2002/0193066 | A1 | 12/2002 | Connelly |
| 2006/0236104 | A1 | 10/2006 | Wong et al. |
| 2007/0118731 | A1 | 5/2007 | Zizzi |
| 2008/0080718 | A1 | 4/2008 | Meijer et al. |
| 2008/0097954 | A1 | 4/2008 | Dutta et al. |
| 2008/0270370 | A1 | 10/2008 | Catellanos et al. |
| 2009/0210414 | A1 | 8/2009 | Shinjo |
| 2010/0266132 | A1 | 10/2010 | Bablani et al. |
| 2010/0306221 | A1 | 12/2010 | Lokam et al. |
| 2011/0129089 | A1 | 6/2011 | Kim et al. |
| 2014/0024425 | A1 | 1/2014 | Wolff et al. |
| 2016/0070740 | A1 | 3/2016 | Vermeulen et al. |
| 2016/0371503 | A1 | 12/2016 | Spalka et al. |
| 2017/0041298 | A1 | 2/2017 | Lehnhardt et al. |

OTHER PUBLICATIONS

Notice of Allowance dated Apr. 5, 2018 for U.S. Appl. No. 15/286,638, 12 pages.
Final Office Action dated Jan. 29, 2018 for U.S. Appl. No. 15/202,672, 13 pages.
Notice of Allowance dated Apr. 18, 2018 for U.S. Appl. No. 15/202,672, 12 pages.
European Search Report dated Nov. 6, 2015 for EP Application No. EP 13186330, 16 pages.
Office Action dated Jun. 6, 2017 for EP Application No. EP 13186330, 8 pages.
Restriction Requirement dated Feb. 5, 2016 for U.S. Appl. No. 14/495,980, 7 pages.
Non-Final Office Action dated Apr. 14, 2016 for U.S. Appl. No. 14/495,980, 10 pages.
Notice of Allowance dated Jul. 15, 2016 for U.S. Appl. No. 14/495,980, 10 pages.
Non-Final Office Action dated Oct. 12, 2017 for U.S. Appl. No. 15/286,638, 13 pages.
Non-Final Office Action dated Sep. 28, 2017 for U.S. Appl. No. 15/202,672, 14 pages.
Office Action dated Jun. 6, 2017 for EP Application No. EP 13186333, 8 pages.
European Search Report dated May 15, 2017 for EP Application No. EP 16204660.1, 10 pages.
De Couto, Douglas, "One Dimensional Binary Searching," Mar. 17, 1998; XP055375942; retrieved from http://groups.csail.mit.edu/graphics/classes/6.838/S98/meetings/m13/1d-bst.html on May 24, 2017; 4 pages.
Knuth, Donald E., "The Art of Computer Programming, vol. 3: Sorting and Searching, Second Edition;" May 24, 1998; Addison-Wesley Professional; XP55232565, 8 pages.
Knuth, Donald E., "Sorting and Searching—The Art of Computer Programming;" Jan. 1, 1998; Addison-Wesley; XP002053794; pp. 406-419.
European Search Report dated Nov. 9, 2015 for EP Application No. EP 13186333, 16 pages.
Non-Final Office Action dated May 11, 2016 for U.S. Appl. No. 14/495,981, 29 pages.
Notice of Allowance dated Sep. 26, 2016 for U.S. Appl. No. 14/495,981, 17 pages.
Al-Sakran, H.O. et al., "Efficient Cryptographic Technique for Securing and Accessing Outsourced Data," International Journal of Computer Science and Information Security,vol. 9, No. 8, Aug. 2011; 6 pages.
Song, D. et al., "Practical Techniques for Searches on Encrytpted Data," Proceedings of the 2000 IEEE Symposium on Security and Privacy, May 2000, 12 pages.

* cited by examiner

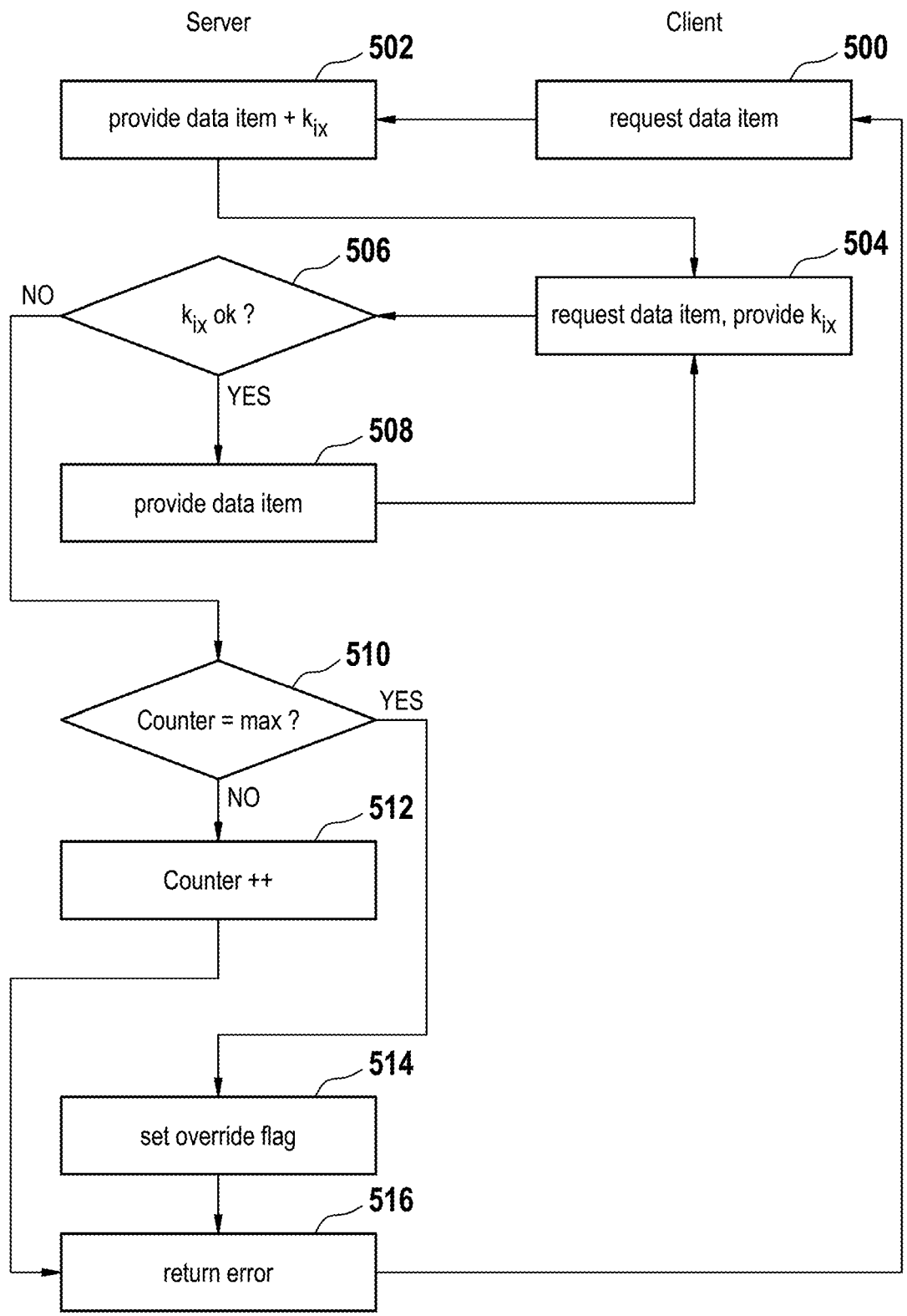

METHOD FOR QUERYING A DATABASE

CROSS REFERENCE TO RELATED APPLICATION(S)

The present application claims priority to European Patent Application No. EP 16 204 660.1, entitled "Method for Querying a Database," filed on Dec. 16, 2016, the entirety of which is herein incorporated by reference.

The invention relates to a method for querying a database stored on a server via a network, a method for querying by a client a database stored on a server via a network, a method for querying a database stored on a server via a network, a computer program product, as well as a system and client computer for querying a database stored on a server and a server computer comprising a database.

Storage and retrieval of encrypted data items from databases in a confidential manner is known for example from EP 2 731 044 A1. A possibility for a search for data items stored in a first relation is described, even though the search specifies a search interval and even though the data items are stored encrypted in the first relation. The retrieval of the data items from the database can be performed without any knowledge of the respective cryptographic key by the database. At no time, the database has to be aware of the first cryptographic key or the plain text content of the data items. Thus, there is no risk of compromising the data items at the database. Nevertheless, standard database techniques can be used for querying the database including usage of indexes.

It is an object of the present invention to provide for an improved method for querying a database stored on a server via a network, an improved method for querying by a client a database stored on a server via a network, an improved method for querying a database stored on a server via a network, an improved computer program product, as well as an improved system and client computer for querying a database stored on a server and an improved server computer comprising a database.

The underlying problem of the invention is solved by the features laid down in the independent claims. Embodiments of the invention are given in the dependent claims.

Embodiments of the invention provide for a method for querying a database stored on a server via a network, the server being coupled to the client computer via the network, wherein the database comprises a relation, the relation comprising data items, the data items forming a partially ordered set in the relation, the method comprising receiving at the client a request for a data operation on a desired data item, the method comprising a. determining as an initial version number of the data items a currently valid version number of the data items, b. traversing, starting from an initial data item of the data items, the relation by repeatedly requesting by the client current data items from the database in order with respect to the partial order until the position of the desired data item or the desired data item itself is identified in the partially ordered set, wherein for each requesting the currently valid version number of the data items of the partially ordered set is determined, the traversing being aborted in case the currently valid version number is different from the initial version number, wherein steps a.-b. may be repeated in case the traversing was aborted, c. in case the traversing was completed, performing the data operation on the identified position of the desired data item or the desired data item itself, d. upon performing the data operation updating the currently valid version number to a new version number, e.g. by the server.

Here the version number is common to all the data items in the relation. Embodiments may have the advantage that data integrity for the request for the data operation can be guaranteed when the processing of the request is to be performed transactional. The transactional character comes from the fact that the client instructs the server step by step (the entirety of the steps is seen as "atomic") which of the data items to successively retrieve thus traveling along, i.e. traversing the data items of the partially ordered set. Thus, a typical request for a data operation may provide a desired data item of the partially ordered set after several roundtrips of data in between the client and the server, each roundtrip comprising new instructions by the client to the server at which position in the partially ordered set the next data item is to be retrieved by the server. Then, the client obtains said data item, optionally decrypts it in case it is encrypted, and again determines at which position in the partially ordered set the next data item is to be retrieved etc.

This means, based on the retrieved data items the client determines either where in the partially ordered set to perform the data operation or which data item to retrieve next. Thus, a data operation is not just a simple command to the server but is a transaction with multiple steps that are seen as atomic wherein in each step the client requests data items from the server, analyzes them and based on that finally tells the server where in the partially ordered set to perform the data operation.

The data integrity for the request for the data operation may be guaranteed since for any transaction involving multiple server client roundtrips a control means is provided via the version number of the partially ordered set if the data items that have been traversed for performing the transaction are still up to date. In case in the meantime a data item in the partially ordered set was changed, this change is reflected in a change of the version number of the partially ordered set and is thus detectable. As a consequence, the process of data item traversal may be restarted with the new determination of a (new) initial and actual version number.

Generally, the partial order is formed with respect to the data items. In case the data items are stored encrypted in the first relation, the partial order is formed with respect to the data items in non-encrypted form. In the context of the present disclosure, a partially ordered set is understood as any set of data elements that formalizes the concept of an ordering, sequencing, or arrangement of the elements of a set. A partially ordered set consists of a set together with a binary relation that indicates that, for certain pairs of elements in the set, one of the elements precedes the other. Such a relation is called a partial order to reflect the fact that not every pair of elements need be related: for some pairs, it may be that neither element precedes the other in the partial ordered set.

The partially ordered set reflects a predefined sorting order of the data items, e.g. a lexicographic sorting order. Thus, in the partially ordered set all the sorted data items are mapped onto the partial order.

In accordance with an embodiment of the invention the data items are tuples or attribute values of an attribute. The above-described procedure can thus be applied either for tuples as a whole, or parts of tuples or to individual attribute values. It has to be noted here, that the description is not limited to single values of an attribute. An attribute may also comprise multiple elements like for example multiple numbers separated from each other by for example, commas, semicolons or even multiple Boolean operators.

Generally, a data item as understood herein is any data value of a data element of a set of elements like for example a tuple that comprises one or more data elements, such as a data value of a data field of a data record that has multiple data fields, within a database, such as a relational data-base, object oriented databases, object relational databases, hierarchical databases, noSQL databases, or in-memory database. For example, a medical data record of a patient may comprise various data elements, e.g. data fields, such as name, address, telephone number and medical data fields of that patient where data values for name, address and telephone number are exemplary data items.

In accordance with an embodiment of the invention, the determining of the initial version number of the data items comprises requesting the initial data item by the client, and receiving in response the initial data item and as the initial version number the currently valid version number of the data items. This may have the beneficial effect that automatically upon request of any data item by the client for the first time (initial) for a given transaction the client is provided with the initial version number, i.e. the version number which will be the reference for all further client-server communication when performing the transaction, i.e. the data operation on a desired data item.

In accordance with an embodiment of the invention, the requesting is further comprising transmitting the initial version number from the client to the server and receiving the transmitted initial version number by the server. Further, the determining if the currently valid version number is different from the initial version number is performed by the server and comprises by the server comparing the transmitted initial version number with the currently valid version number. Further, the aborting of the traversing is performed by the server. This may have the beneficial effect that the server has full control over the transaction process—the transaction is only completed in case the version number is unchanged which can be easily detected at the server since the server manages the allocation of the version numbers. Thus, in case there is a change in a version number during the transaction, it is the server that has knowledge about this change first and any unnecessary data transfers of data items (that are already outdated or associated with an old version number) are avoided.

In accordance with an embodiment of the invention, the current data items are requested from the database individually or in subsets of current data items, the transmitting of the initial version number from the client to the server being performed with each request. As mentioned above, this enables the server the check in each step if the version number is up to date. It has to be noted here that the current data items may either be requested and transmitted individually or in subsets. A subset is a connected set of the current data items that are transmitted together at once from the server to the client. For example, in case in the relation the data items form the partial ordered set via a tree, the individual data items are represented by nodes of the tree while a subset corresponds to multiple ones of the nodes in a subtree of the tree.

In accordance with an embodiment of the invention, the method further comprises notifying the aborting to the client, wherein the client in response to the notifying may initiate the repetition of the steps a.-b.

In accordance with an embodiment of the invention, the updating of the currently valid version number to the new version number comprises an incrementing of the currently valid version number.

In accordance with an embodiment of the invention, the request for the data operation on the desired data item comprises anyone of
- a read request of the desired data item,
- a request for a modification of the desired data item,
- a request for inserting the desired data item into the partially ordered set, the position of the desired data item being the position in the partial ordered set at which the desired data item is to be inserted.

A read request or a request for a modification of the desired data item addresses a concrete nameable or addressable data item in the partially ordered set such that the partially ordered set has to be traversed until said concrete data item is identified. Then, the data item can be read or modified. In contrast thereto, the request for inserting the desired data item identifies the position in the partially ordered set at which the desired data item is to be inserted.

For example, regarding the desired data item a respective data item in the partially ordered set immediately preceding the desired data item is identified such that it is evident that the desired data item has to be inserted in the partially ordered set at a position immediately after said identified data item. "Preceding" has to be understood regarding the partial order of the set.

In accordance with an embodiment of the invention, in case the request for the data operation on the desired data item comprises the request for inserting or modification, the performing of the data operation comprises inserting the desired data item into the partially ordered set or modifying the desired data item, the inserting and/or the modifying being implemented at the server as stored procedures.

This may have the beneficial effect that the request for inserting or modification can also be treated as a single step at the client. Since the stored procedure is a subroutine available to applications that access the database any complex operations involved in the command or step "insert" can be implemented in an easy manner. Further, in case of any error that may occur during execution of said complex operations involved in the command a server side automatic roll back of the complex operations is possible without the need of any intervening by the client. This reduces the communication effort between the client and the server while the consistency requirement for the transaction is fulfilled.

In accordance with an embodiment of the invention, in case the data operation is a read request and for that read request the number of abortions of the traversing exceeds a predetermined threshold, the method further comprises
- providing a read override flag to the partially ordered set, the read override flag blocking any new data operations on the data items involving a modification of at least a subset of the data items or an inserting of a further data item into the subset of the data items,
- releasing the read override flag after the data operation on the identified position of the desired data item or the desired data item itself was completed.

For example, the subset of the data items comprises only the traversed data items.

The implementation of a read override flag may have the advantage that the process of performing the data operation is not unsuccessfully repeated over and over again for an indefinite amount of time due to continuous write accesses to the partially ordered set that occur by for example a third party while attempting to perform the data operation. In case for example read access processes are overridden n times, e.g., n=5 times, the read override flag is set. In turn, the server blocks all new write access processes. In an embodiment, the server blocks only new write access processes that affect the traversal path of the reading process.

It has to be noted that generally the version number of the partially ordered set may change due to any modification of the partially ordered set. The modification may be an insert of a new data item, a modification of an existing data item or a reorganization (reordering) of the existing data items in the partially ordered set. In case in the relation the data items form the partial ordered set via a rooted tree, an example of a reorganization of the existing data items is a rebalancing of the tree. The rebalancing may be performed by the server.

In accordance with an embodiment of the invention, the data items are encrypted with a cryptographic key in the relation, the partial order being formed with respect to the data items in non-encrypted form, the requesting and receiving by the client of the current data items from the database in order with respect to the partial order comprising by the client receiving the current data item, decrypting the current data item using the cryptographic key, providing a request for a new current data item to the database, the request comprising information that the new current data item is to be retrieved from a position in the partial order succeeding or preceding the position of the current data item, depending if the position of the desired data item in the partial order is preceding or succeeding the position of the decrypted current data item.

This may have the advantage that a data operation regarding data items in the relation is possible, even though the data items are stored encrypted in the relation. The retrieval of the data items from the database can be performed without any knowledge of the respective cryptographic key by the database. At no time, the database has to be aware of the cryptographic key required for decrypting the current data item or the plain text content of the data items in general. Thus, there is no risk of compromising the data items at the database. Nevertheless, standard database techniques can be used for querying the database including usage of indexes. Therefore, the search and retrieval of data items is quick. Further, the amount of data to be transmitted between the client computer and the database is limited to a minimum. For example, only standard queries, version numbers and retrieved data items may be transmitted between the client computer and the database. This may predestine the employment of the described method in a cloud computing environment with the database being part of the cloud.

Further, any communication between the client computer and the database is secure since any data items that are transmitted in between the client computer and the data base are encrypted by a respective cryptographic key.

The cryptographic key as used throughout the description is to be understood as a synonym for either a symmetric key or any asymmetric cryptographic key pair.

In accordance with an embodiment of the invention, in case the request for the data operation on the desired data item comprises the request for inserting, the performing of the data operation comprises inserting the desired data item into the partially ordered set in encrypted form, the encryption being performed using the cryptographic key.

In accordance with an embodiment of the invention, in the relation the data items form the partial ordered set via a rooted tree, the initial data item being the data item stored at the root of said tree. Preferably the tree is automatically balanced by the database such that the speed for determining the interval boundaries is maximized.

In another aspect, the invention relates to a method for querying by a client a database stored on a server via a network, the server being coupled to the client computer via the network, wherein the database comprises a relation, the relation comprising data items, the data items forming a partially ordered set in the relation, the method comprising receiving at the client a request for a data operation on a desired data item, the method comprising a. determining as an initial version number of the data items a currently valid version number of the data items, b. traversing, starting from an initial data item of the data items, the relation by repeatedly requesting by the client current data items from the database in order with respect to the partial order until the position of the desired data item or the desired data item itself is identified in the partially ordered set, wherein for each requesting the initial version number is transmitted from the client to the server, wherein in response to each requesting either the current data item or a notification of an aborting is received from the server, the aborting being the result that a currently valid version number is different from the initial version number, wherein steps a.-b. may be repeated in case the traversing was aborted, c. in case the traversing was completed, performing the data operation on the identified position of the desired data item or the desired data item itself.

In another aspect, the invention relates to a method for querying by a client (10) a database (30) stored on a server (22) via a network (48), the server (22) being coupled to the client (10) computer via the network (48), wherein the database (30) comprises a relation (32), the relation (32) comprising data items (80-181), the data items forming a partially ordered set in the relation (32), the method comprising receiving at the client (10) a request (19) for a data operation on a desired data item, the method comprising by the client a. receiving as an initial version number of the data items a currently valid version number of the data items from the server, b. traversing, starting from an initial data item of the data items, the relation (32) by repeatedly requesting by the client (10) current data items from the database (30) in order with respect to the partial order until the position of the desired data item or the desired data item itself is identified in the partially ordered set, wherein for each requesting the initial version number is transmitted from the client (10) to the server (22), wherein in response to each requesting either the current data item or a notification of an aborting is received from the server (22), the aborting being the result that a currently valid version number is different from the initial version number, wherein steps a.-b. may be repeated in case the traversing was aborted, c. in case the traversing was completed, performing the data operation on the identified position of the desired data item or the desired data item itself.

In another aspect, the invention relates to a method for querying a database stored on a server via a network, the server being coupled to the client computer via the network, wherein the database comprises a relation, the relation comprising data items, the data items forming a partially ordered set in the relation, the method comprising by the server
- a. determining as an initial version number of the data items a currently valid version number of the data items, and transmitting the initial version number to the client,
- b. repeatedly receiving requests for the data items from the client, the requests comprising the initial version number, wherein for each request the currently valid version number of the data items of the partially ordered set is determined, and providing in response to the requests the requested data items to the client in case the currently valid version number matches the received initial version number, the providing being aborted in case the currently valid version number is different from the received initial version number.

For example, the requests for the data items are request in an atomic transaction initiated by the client. The first request for the data items in said atomic transaction may trigger the determining and transmitting of the initial version number to the client. Thereafter, the further requests of said atomic transaction for the data items are received from the client.

In another aspect, the invention relates to a computer program product comprising computer executable instructions to perform the method as described above.

In another aspect, the invention relates to a system for querying a database stored on a server via a network, the system comprising a client and the server, the server being coupled to the client computer via the network, wherein the database comprises a relation, the relation comprising data items, the data items forming a partially ordered set in the relation, the client being adapted for receiving a request for a data operation on a desired data item, the system being adapted for
- a. determining as an initial version number of the data items a currently valid version number of the data items,
- b. traversing, starting from an initial data item of the data items, the relation by repeatedly requesting by the client current data items from the database in order with respect to the partial order until the position of the desired data item or the desired data item itself is identified in the partially ordered set, wherein for each requesting the currently valid version number of the data items of the partially ordered set is determined, the traversing being aborted in case the currently valid version number is different from the initial version number, wherein steps a.-b. may be repeated in case the traversing was aborted,
- c. in case the traversing was completed, performing the data operation on the identified position of the desired data item or the desired data item itself,
- d. upon performing the data operation updating the currently valid version number to a new version number by the server.

In another aspect, the invention relates to a client computer for querying a database stored on a server via a network, the server being coupled to the client computer via the network, wherein the database comprises a relation, the relation comprising data items, the data items forming a partially ordered set in the relation, the client being adapted receiving at the client a request for a data operation on a desired data item, the client being adapted for
- a. receiving from the server as an initial version number of the data items a currently valid version number of the data items,
- b. traversing, starting from an initial data item of the data items, the relation by repeatedly requesting by the client current data items from the database in order with respect to the partial order until the position of the desired data item or the desired data item itself is identified in the partially ordered set, wherein for each requesting the initial version number is transmitted from the client to the server, wherein in response to each requesting either the current data item or a notification of an aborting is received from the server, the aborting being the result that a currently valid version number is different from the initial version number, wherein steps a.-b. may be repeated in case the traversing was aborted,
- c. in case the traversing was completed, performing the data operation on the identified position of the desired data item or the desired data item itself.

In another aspect, the invention relates to a server computer comprising a database, the server being coupled to a client computer via a network, wherein the database comprises a relation, the relation comprising data items, the data items forming a partially ordered set in the relation, the server being adapted for
- d. determining as an initial version number of the data items a currently valid version number of the data items, and transmitting the initial version number to the client,
- e. repeatedly receiving requests for the data items from the client, the requests comprising the initial version number, wherein for each request the currently valid version number of the data items of the partially ordered set is determined, and providing in response to the requests the requested data items to the client in case the currently valid version number matches the received initial version number, the providing being aborted in case the currently valid version number is different from the received initial version number.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Within the context of the present invention, a database index is a data structure that improves the speed of data retrieval and manipulation operations. Indices may be created using one or more columns of a database table, providing the basis for both rapid random lookups and efficient access of data items.

It is understood in advance that although this disclosure includes a detailed description on cloud computing in FIGS. 4 and 5, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

It is understood that one or more of the aforementioned embodiments of the invention may be combined as long as the combined embodiments are not mutually exclusive.

In the following, preferred embodiments of the invention are described in greater detail by way of example only using the following figures in which:

FIG. 5 depicts a flowchart for setting an override flag.

Throughout the following description of various embodiments of the invention identical reference numerals are used for designating like or identical elements.

In general it has to be noted that in case 'nodes' are mentioned, this is considered as being a synonym for an encrypted data item. However, all the described features are also applicable to non-encrypted data items, such that a node may also correspond to a non-encrypted data item.

Figure 1:
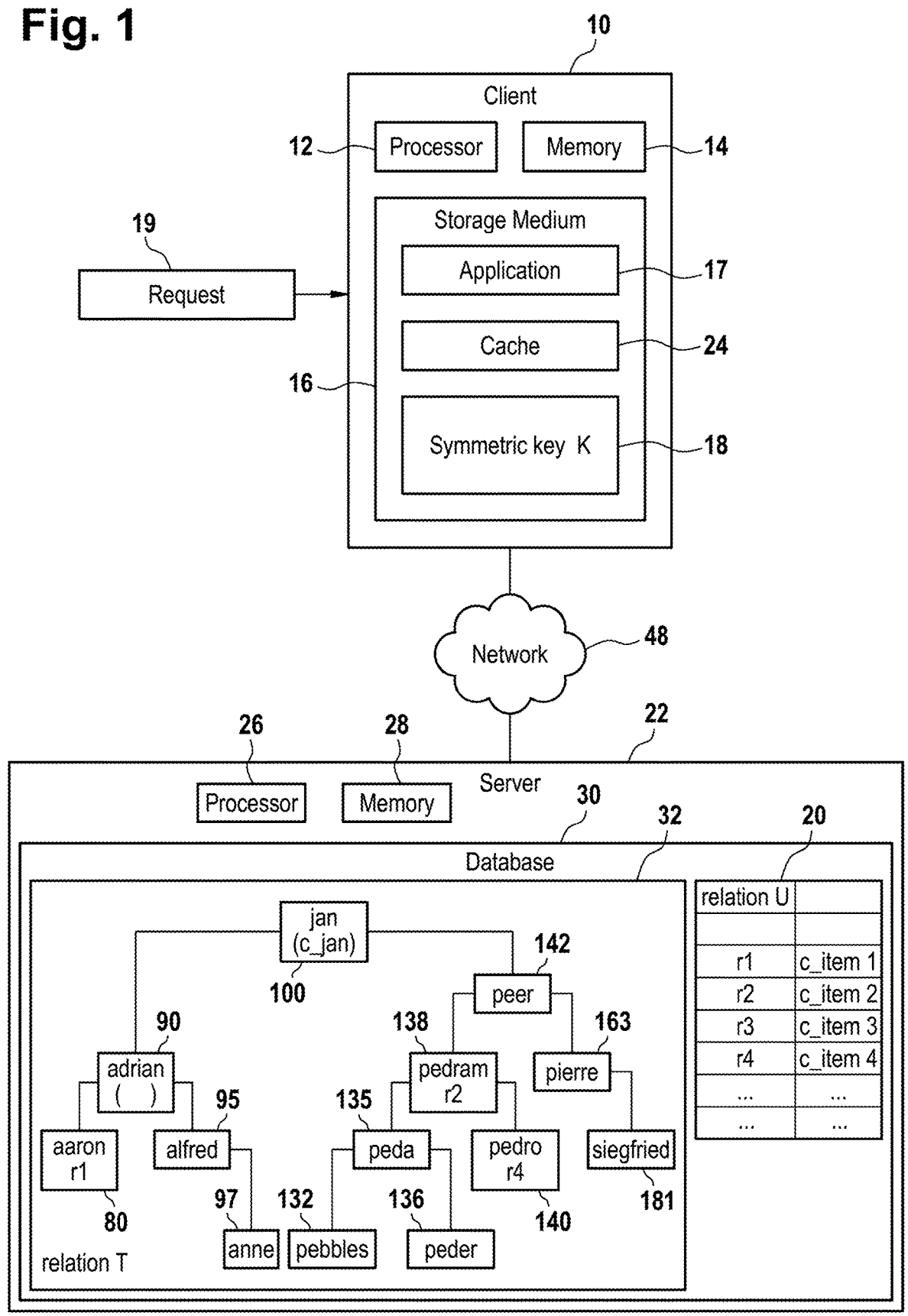
FIG. 1 illustrates a computer system for querying a database.

FIG. 1 illustrates a computer system comprising a client computer 10 and a database 30 stored on a server 22. The server 22 is coupled to the client computer 10 via a network 48. The database 30 comprises a first relation 32, called T, which in the example of FIG. 1 is a rooted tree. Further, the database 30 comprises a relation U designated by reference numeral 20 which comprises two columns.

The client has a processor 12 and a memory, like for example a RAM memory 14. Further, the client 10 has a storage medium 16 stored thereon an application 17 and a symmetric key K 18. The storage medium further comprises a cache 24 whose purpose will be described later.

Similarly, the server 22 has a processor 26 and a volatile memory 28. It has to be noted here, that for the given examples the usage of a symmetric key is assumed.

However, the explained concept is also applicable for usage of asymmetric key pairs instead of a symmetric key.

Without restriction to generality, in the following it is assumed that the computer system is located in a medical environment. For example, the client 10 may be part of a medical office or a hospital and the database 30 of the server 22 is located in an external database center, like a cloud computing center. Thus, the client 10 and the server 22 are located in different locations.

Also, without restriction to generality it is assumed that the first relation 32 stores as attribute first names ai in encrypted form (c_ai; i=1 . . . m) and a referential connection r1 . . . rm for each encrypted first name. The referential connections assign each data item ai (i.e. each first name) to an encrypted data item c_item stored in the second relation U (reference numeral 20). Further, the data items c_ai form a partially ordered set in the first relation T, the partial order being formed with respect to the data items in non-encrypted form. For example, the linear order the partial order expresses is a lexicographic order Further, without any restriction to generality it is assumed that the encrypted data items c_ai are annotated with integer elements of a linear order in the database, wherein the linear order is corresponding to the order in which the encrypted data items are stored in the first relation with respect to the partial ordered set. The elements of linear order are shown in integer numbers, for example 100, 142, 138, 135 etc.

In the example of FIG. 1, for the sake of simplicity the data items are shown both in encrypted form (for example c_jan) and in decrypted form (for example for the first name "jan"). However, it will be understood that the server 22 will never be aware of any decrypted versions of the data items c_ai.

Further, the referential connections are only illustrated for a limited number of encrypted data items.

It has to be noted here that the encrypted data items c_ai stored in the relation T are encrypted with the cryptographic key K in the first relation. Further, the data items form a partially ordered set in the first relation. In the first relation the partial order is formed with respect to the data items of said first relation in non-encrypted form. This means, that in the example of FIG. 1 in the first relation the encrypted data items are lexicographically sorted. For example pebbles<peda<pedram<peer; aaron<adrian<jan . . . . This sorting is reflected in the first relation by providing each c_ai with respective order information. In the example of FIG. 1, the order information is given by the arrangement of the data items in the rooted tree.

Since the client computer 10 and the server 22 are used for handling of medical data records, it is crucial that any information leaving the client and thus the environment of the medical office is -kept confidential. It has to be ensured that no unauthorized person may ever have access to the patient data records. This includes the administrator of the database 30 at the server 22. Therefore, any data communicated over the network 48 must be encrypted. The same holds for any data stored in the database 30.

The usage of relation T is beneficial for various tasks. For example, a request 19 received at the client 10 may be a request for a certain interval of patient names, for example a part of a first name of a patient plus a wildcard. An example would be the search for the first name "Ped*" which includes names like Pedram and Pedro etc. The reason for such a search criterion "Ped*" is the following: in order to ease the handling of retrieval of patient records, at the reception desk of the medical office the secretary may wish to type a patient's first name without knowing in detail how the name is spelled. Thus, instead of querying the database for the exact name "Pedram", the secretary may decide to search for "Ped*". In this case, the request is issued by a user of the client 10.

The interval is determined by $x \in [\text{ped}, \text{pee})$. Then the client requests an encrypted data item from the database. Since the relation T is a rooted tree, which preferably is automatically balanced by the database, the requested encrypted data item is the root of the tree. In response to said requesting of the encrypted data item, the encrypted data item c_jan is obtained, which is then decrypted for obtaining a decrypted data item.

Then it is determined if the decrypted data item "jan" lies within the search interval. Since "jan" is outside the search interval, in the next step an encrypted data item is requested, wherein the request for the encrypted data item comprises information that the encrypted data item is to be retrieved from a position in the partial order preceding or succeeding the position of the encrypted data item "c_jan", depending if the interval boundary is preceding or succeeding the decrypted data item with respect to the partial order. Since the boundary "ped" is succeeding the position of "jan", the requested encrypted data item is requested at a position following "jan" in the right direction of the tree in FIG. 1. Such kind of successive determination of data items is called traversing the relation by repeatedly requesting by the client current data items from the database in order with respect to the partial order.

As a result, the data item c_peer is received and decrypted. Then it is determined if the decrypted data item "peer" lies within the search interval. Since "peer" is still outside the search interval, in the next step an encrypted data item is requested, wherein the request for the encrypted data item comprises information that the encrypted data item is now to be retrieved from a position in the partial order preceding the position of the encrypted data item "c_peer". The reason is that the boundary "ped" is preceding the position of "peer". Thus, the requested encrypted data item is requested at a position preceding "peer" in the left direction of the tree in FIG. 1.

As a result, the new data item c_pedram" is received and decrypted. Then it is determined if the decrypted data item "pedram" lies within the search interval. Since this is the case, in the subsequent step a request for an encrypted data item is made by the client, wherein the request for the encrypted data item comprises information that the encrypted data item is to be retrieved from a position in the partial order again preceding the position of the encrypted data item "c_pedram".

As a response, "c_peda" is received and decrypted. Then it is determined if the decrypted data item "peda" lies within the search interval. Since this is the case, in the subsequent step a request for an encrypted data item is made by the client, wherein the request for the encrypted data item comprises information that the encrypted data item is again to be retrieved from a position in the partial order preceding the position of the encrypted data item "c_peda".

As a response, "c_pebbles" is received and decrypted. Then it is determined if the decrypted data item "pebbles" lies within the search interval. However, "pebbles" lies outside the search interval [ped, pee). Therefore, the decrypted data item which was last identified as lying in the search interval is determined as the data item forming the interval boundary of the search interval. Thus the interval boundary is given by the element "peda".

Thereafter, the same procedure is repeated with the prerequisite that the interval boundary shall be given by the greatest element being lexicographically "smaller" than "pee". This results with similar steps as described above in the identification of the element "c_pedro". Thus, the interval boundaries of the search interval [ped, pee) are formed by the data items "c_peda" and "c_pedro".

Then the client requests the database to determine the integer numbers annotated to the encrypted data items "c_peda" and "c_pedro" and to provide all encrypted data items having integer numbers in between said determined integer numbers. Since the integer number of "c_peda" is 135 and the integer number of "c_pedro" is 140, the resulting data items satisfying the search interval are given by the data items with annotated integer numbers 135, 136, 138, 140.

It has to be noted that this provision of all encrypted data items having integer numbers in between said determined integer numbers can be performed by common database techniques readily available in many common databases. Thus, such kind of data item provision may be accomplished with high performance.

It has to be noted here, that preferably the data items "c_peda" and "c_pedro" are already available at the client such that another retrieval of said data items from the server is not necessary.

Then the data item "c_pedram" is decrypted. Then the client requests from the database the information content associated with the data items "c_peda", "c_peder", "c_pedram" and "c_pedro". In the present example, a referential connection r2 exists assigning "c_pedram" to the data item c_item2 in the relation U (20). Further, a referential connection r4 exists assigning "c_pedro" to the data item c_item4 in the relation U. Similarly, a referential connection may exist for "c_peda".

Finally, the requested data items c_item2 etc. are decrypted using again the symmetric key K of the client 10. However, as mentioned above also a different key may be employed for the data items c_item.

Thus, in summary by receiving a prefix search "Ped*", the client is able to retrieve all data items of relation T and relevant information content in a very efficient and fast manner. Nevertheless, the database 32 or the server 22 is neither aware of the content of the data items nor the associated information content.

The above is described in detail in EP 2 731 044 A1 which is incorporated in its entirety by reference.

In the following it is assumed that the request 19 that the client 10 received is a request for a data operation on a desired data item, for example a request for an insert operation of a new data item "Pedrow" in encrypted form into relation T. In the following in FIG. 2, the term update data item is used as a synonym for the new data item to be inserted into relation T.

Figure 2:
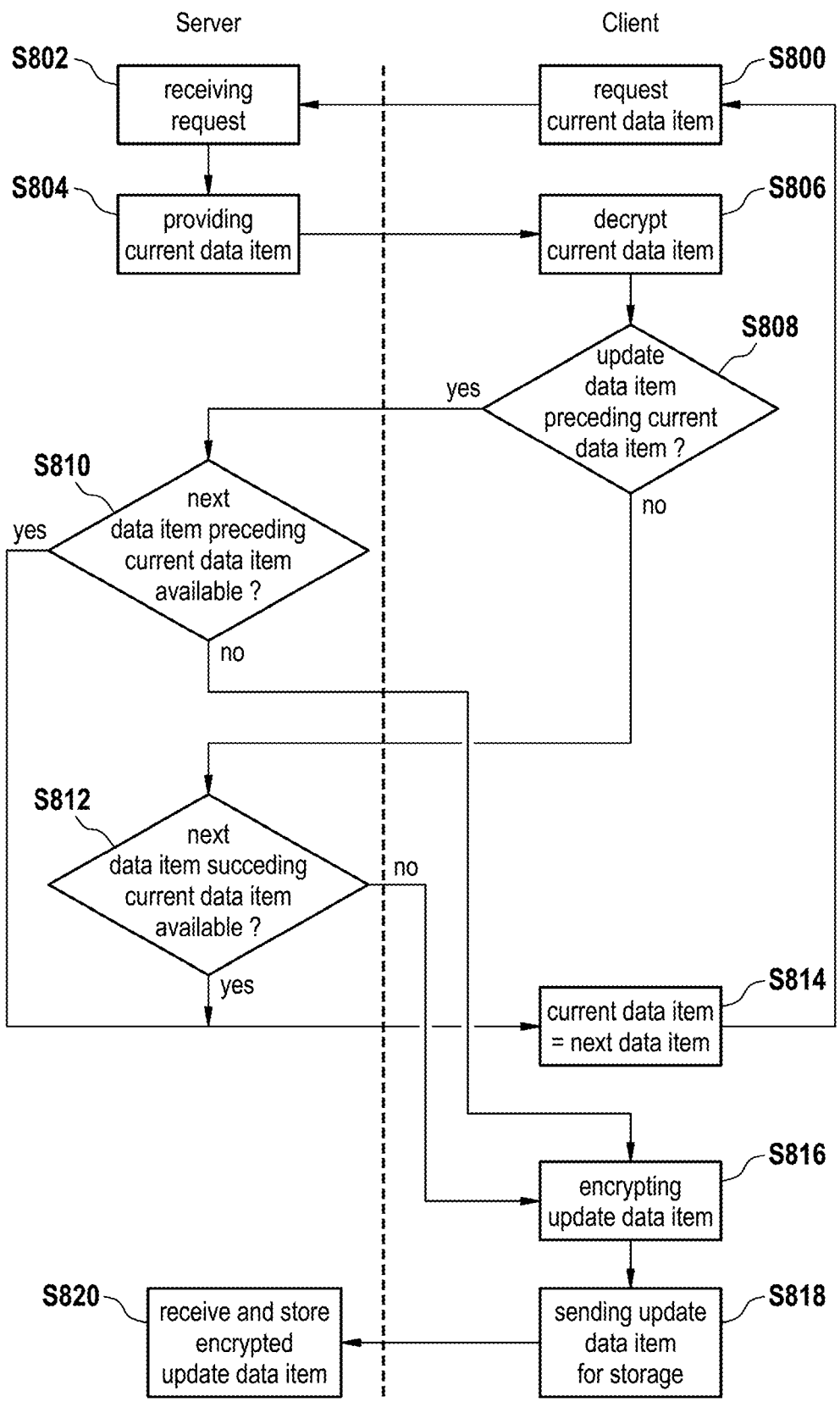
FIG. 2 is a flow chart illustrating steps of updating a database.

FIG. 2 is a flowchart illustrating how such a request 19 is handled. After having received the request 19 at the client, the client starts traversing, starting from an initial data item of the data items, the relation T by repeatedly requesting by the client current data items from the database in order with respect to the partial order until the position of the desired data item is identified in the partially ordered set.

Again, since relation T is a rooted tree, in step S800 the client will request as current data item from the server the root node. In step S802 the server receives the request and in turn provides in step S804 the encrypted data item 100 "c_jan". In step S806 the current encrypted data item is received and decrypted by the client using the first cryptographic key. This results in "jan" at the client. Now, the client will compare the current decrypted data item with "Pedrow" to be stored in the database. Depending if the update data item is preceding or succeeding the current decrypted data item with respect to the partial order, either step S810 or step S812 is following:

In case "Pedrow" is located at a position in the partial order preceding "jan", in step S810 a request is provided to the database for determining the availability of a new encrypted data item in the first relation immediately preceding c_jan. In case "Pedrow" is located at a position in the partial order succeeding "jan", in step S812 a request is provided to the database for determining the availability of a new encrypted data item in the first relation immediately succeeding c_jan.

In case in step S810 or S812 it turns out that the new encrypted data item is available in the first relation, the method continues with step S814 by defining the current encrypted data item being the new encrypted data item. Then the method loops back to step S800 with requesting another current data item.

In the present example, since "Pedrow" is succeeding "jan" step S808 is followed by step S812. Since c_peer (142) is succeeding c_jan (100) and thus a next data item is available, the method loops back to step S800 via step S814 and as current data item c_peer (142) is requested in step S800.

Using this principle the traversing of the tree is from c_jan to c_peer to c_pedram to c_pedro (140). Here, in step S812 it turns out that the new encrypted data item is unavailable in the first relation such that the method continues with step S816 (step S810 would be analogous in case of a preceding current data item is required). This means that the current encrypted data item c_pedro forms the leaf of the tree. Consequently, the position at which the encrypted version of c_Pedrow is to be inserted in the tree is the position "below" said leaf of the tree, i.e. at a depth of the tree which is larger by for example one level than the depth of the leaf describing the current encrypted data item. Thus, the position of the desired data item Pedrow is determined.

This is reflected in step S816ff: in case the new encrypted data item is unavailable in the first relation, the update data item is encrypted with the first cryptographic key (S816) for obtaining an encrypted update data item c_Pedrow. Then the storage request is provided to the database (S818), the storage request comprising the encrypted update data item c_Pedrow and a position information, the position information instructing the database to store the encrypted update data item in the first relation at a position in the partial order immediately preceding or succeeding the position of the current encrypted data item, depending if the update data item is preceding or succeeding the current decrypted data item with respect to the partial order.

Performing the transaction "insert node Pedrow in relation T" thus involves multiple steps in which the client repeatedly requests current data items from the server and traverses the tree. However, in case while performing the transaction, i.e. while traversing the tree, one of the nodes of the tree is modified or a new node was added to the tree, the traversing has to be aborted and the transaction has to be restarted. This ensures the integrity of the data operation. Not aborting the transaction may result in the insertion of c_Pedrow at a wrong position in the tree.

The above described principles and steps of FIG. 2 as well as the data integrity requirement also hold for a data operation which reads or modifies an existing node of the tree. However, it is understood that in this case S810 and S812 can be replaced by "next data item is given by the data item preceding the current data item" (S810) and "next data item is given by the data item succeeding the current data item" (S812), which steps are both followed by S814. Further, after S806 (decryption of the current data item) and before S808 a determination step is required which determines if the decrypted current data item matches the desired data item or not. In case of a match the method either terminates in case of a read operation (since the desired data item is already retrieved) or in case of an update operation the method continues with S816 and the encryption of the update data item (i.e. the desired data item), followed by S818 and S820. In case of no match, the method continues with S808.

Figure 3:
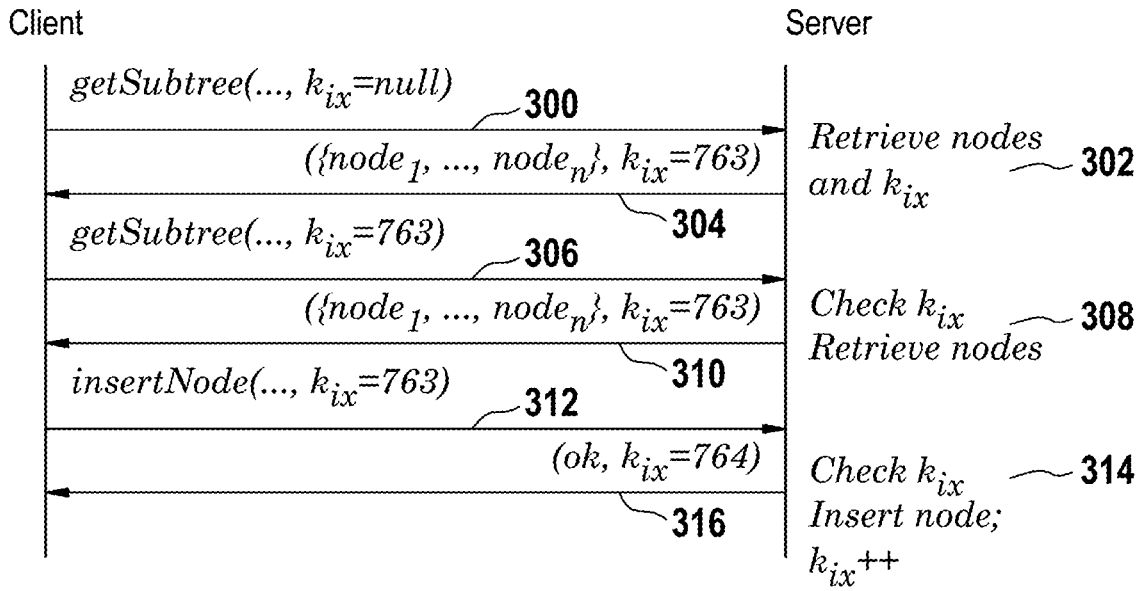
FIG. 3 is a diagram illustrating a communication between a client and a server.

In order to ensure data integrity, a version number is checked at the database. This is illustrated in FIG. 3 which is a diagram illustrating a communication between a client and a server, for example the client 10 and the database 30 of server 22. In the following, FIG. 3 is discussed in combination with the flowchart of FIG. 2.

In case the client requests the current data item in step S800 (reference numeral 300 in FIG. 3) for the first time in a transaction, the database is not only providing the current data item as such in step S804 (304) to the client but in addition an initial version number $k_{ix}$ of the tree in relation T is provided. The fact that the client requests the current data item for the first time for a new transaction can be easily detected by the server due to for example an explicit flag set by the client in the request in step S800 (300) "$k_{ix}$=null" or for example due to a lack of any version number that was transmitted together with the request from the client to the server. In case the server detects that the client requests a current data item for the first time in a transaction, in step S804 not only the current data item is provided but also the currently valid version number $k_{ix}$, which will then be considered by the client as "the initial version number".

Generally, the version number $k_{ix}$, may be altered by the server upon any modification of the relation T. For example, any adding or modification of data items in the tree will automatically lead to a modification, for example an increment in the version number of the relation T. Preferably, the version number is an integer number, that is simply incremented in steps of one from one tree modification to the next tree modification.

In FIG. 3 the client does not request a "current data item" from the server and send a respective request to the server, but the client requests a whole sub-tree. In the example of FIG. 1, a sub-tree may comprise all nodes hanging below a certain node and the request may be a request for said certain ancestor node together with all descendants nodes until n levels below said ancestor node. In the example of FIG. 1, a request for a sub-tree "get sub-tree" may be a request for all nodes starting from node 142 and including all descendant nodes up to two levels below said node 142. In turn, the server will retrieve nodes 142, 138, 163, 135, 140 and 181.

Requesting of sub-trees instead of individual nodes (individual current data items) may be beneficial since the number of round trips between the client and the server is and are reduced. Thus, with a single round trip the amount of data that is transmitted from the server to the client is increased, however within a single request-response procedure, which may be beneficial in case of connections between the client and the server with high latency times. Although the method is applicable to sub-tree retrieval, for the sake of simplicity and without restriction to generality in the following only the retrieval of individual nodes will be discussed.

As discussed above, in case the client requests a data item for a given transaction for the first time, the client may submit to the server the information that its known version number has no value ($k_{ix}$=null) in step 300 of FIG. 3 and in turn in step 302 of FIG. 3 the server retrieves the requested node (data item) and the initial version number of the tree. The initial version number is the actual version number $k_{ix}$ of the tree. In step 304 the server returns the requested node together with the initial version number $k_{ix}$=763. Returning the initial version number is the server's reaction that the client submitted version number null.

After the client has received the requested node (data item), steps S806ff of FIG. 2 are performed. Assuming that the method looped back to step S800, the client requests a subsequent current data item. The client transmits together with the request of the subsequent current data item the initial version number. This transmission of the request of the current data item together with the initial version number ($k_{ix}$=763) is denoted with reference numeral 306 in FIG. 3. After in step S802 the server has received the request, the server retrieves in step 308 the currently valid version number $k_{ix}$ that is currently valid for the relation T and compares this currently valid version number with the received initial version number. In case the initial version number corresponds to the currently valid version number, this means that the tree was not modified. In turn, in step S804 (310 in FIG. 3) the server provides the current data item to the client. Additionally providing $k_{ix}$=763 to the client is optional. After the client has received the requested node (data item), steps S806ff of FIG. 2 are performed.

As a result, with the reception of the respective node in step 310 the client may have identified the position where to insert the desired update data item. Therefore, in step 312 the client submits the update data item to be inserted as a node (insert Node) together with the initial version number $k_{ix}$=763 to the server. This step then corresponds to step S818 of FIG. 2. However, before storing the update data item (inserting the node into the tree), in step 314 the server checks again if the currently valid version number of the relation T is identical with the version number received from the client. If this is the case, the server inserts the node at the desired position that was indicated with the storage request in step 818 and step 312 and transmits information about the successful insertion back to the client (step 316). Further, the currently valid version number which is the initial version number is then increased by one ($k_{ix}$++).

As shown in FIG. 3, with each providing of a data item by the server to the client, it is possible that the server also transmits its currently valid version number to the client. This may be used as a safety mechanism because this enables the client also to determine if a change has occurred to the relation T at the server by comparing the received currently valid version number with the initial version number.

Figure 4:
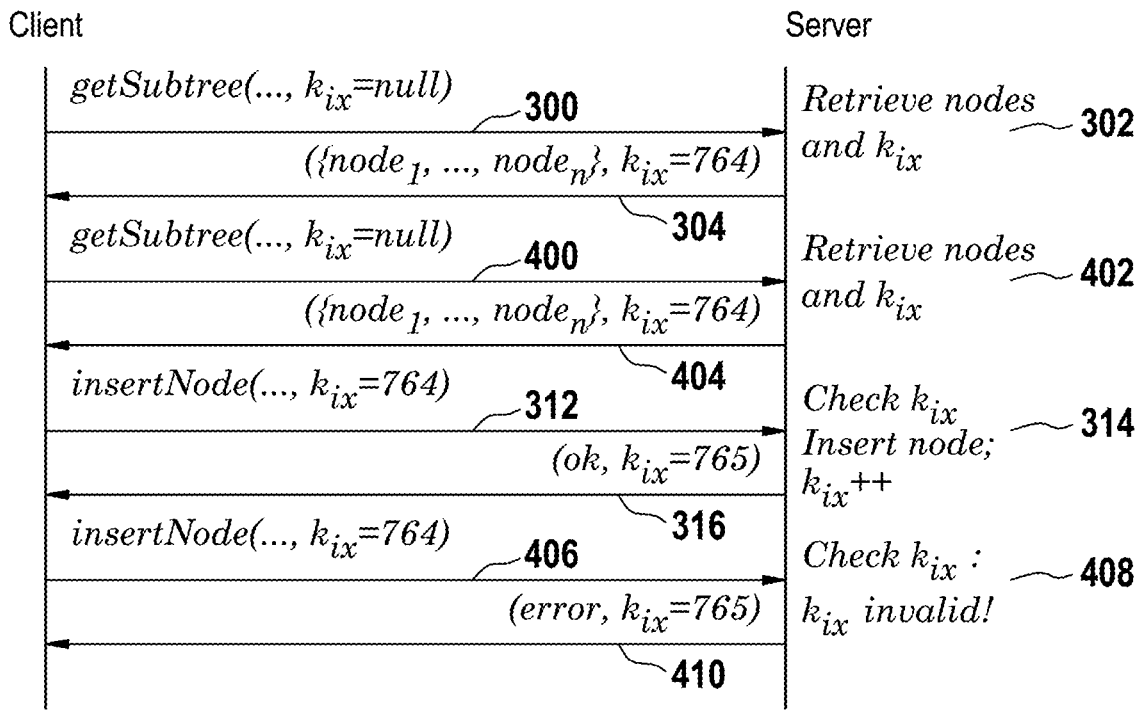
FIG. 4 is a further diagram illustrating a communication between a client and a server.

FIG. 4 is a further diagram illustrating in an exemplary manner a communication between the client and the server, wherein steps 300-316 correspond regarding their technical meaning to steps 310-316 of FIG. 3. However, compared to FIG. 3 in FIG. 4 two concurrent transactions are ongoing between the client and the server. The first transaction is the one discussed above in FIG. 3 and denoted by reference numerals 300-316 and the second one is a transaction with communication steps designated by reference numerals 400-410.

FIG. 4 is basically depicting a continuation of FIG. 3, wherein after the version number of the tree was increased to $k_{ix}$=764 another transaction takes place, in the following the 'first transaction'.

For the first transaction, the client submits in step 310 a request for a data item together with the indication that $k_{ix}$=null, that no version number is yet available to the client for the given transaction. In turn, the server retrieves in step 302 the requested node and $k_{ix}$ and transmits the node and $k_{ix}$=764 to the client (step 304). Thus, the initial version number is $k_{ix}$=764.

After step 304, a second transaction which was initiated independently from the first transaction requests another current data item (a sub-tree) with the indication that $k_{ix}$=null to the server. In the following it is assumed that the same client desires to perform both, the first and the second transaction. However, it is understandable that the first transaction may be performed by a first client and the second transaction may be performed by a second client that is different from the first client.

In turn, in step 402 the server retrieves the respective node and the actually valid version number $k_{ix}$=764 and transmits both in step 404 to the client.

As a result, with the reception of the respective node in step 304 the client may already have identified the position where to insert the desired update data item. Therefore, in step 312 the client submits the update data item to be inserted as a node (insert Node) together with the initial version number $k_{ix}$=764 to the server. In step 314 the server checks again if the currently valid version number of the relation T is identical with the version number received from the client. Since this is the case, the server inserts the node at the desired position that was indicated with the storage request in step 312 and transmits information about the successful insertion back to the client (step 316).

Further, the currently valid version number which is the initial version number is then increased by one ($k_{ix}$++), such that $k_{ix}$=765. With the transmission of the information that the insert was successfully performed by the server (step 316) the first transaction is successfully completed.

For the subsequent step 406 of the second transaction the client also requests to insert a node, however it still transmits its initial version number which is $k_{ix}$=764 to the server. Thereupon, the server checks in step 408 if the received $k_{ix}$ matches the actually valid $k_{ix}$. However, since the actually valid $k_{ix}$ is 765 and not 764, the server determines that the received $k_{ix}$ is invalid and thus returns an error together with the actually valid version number to the client (step 410). The client will be able to understand this as a necessity to restart the second transaction again, i.e. to again start traversal of the nodes of the tree of relation T, this time with the initial version number $k_{ix}$=765. However, instead of restarting the second transaction it is also possible for the client to completely abort the transaction. For example, a user of the client may get notified of a respective read error.

The above described principles regarding the usage of the version number of the tree holds for any kind of data operation on desired data items, i.e. not only for insert operations of nodes but also for read operations or modifying operations of nodes.

In case of so called bulk insert operations, a multitude of nodes are inserted into a given relation. However, this means that during the bulk insert operation, continuous write accesses are taking place in the relation such that the version number of the relation continuously changes. In turn, many read requests to the relation will be blocked by the server due to the continuous change of the version numbers.

However, in the example of the client 10 being part of a medical office or a hospital, this means that during the bulk insert operation the medical office or hospital will not be able to effectively use the database since read operations may practically become impossible. For that reason, a concept of using read override flags may be used, which in the following will be discussed with respect to the flowchart of FIG. 5. The method starts in step 500 with the requesting of a data item. Step 500 corresponds to step S800 in FIG. 2 and step 300 of FIG. 3. In return, in step 502 the server provides the requested data item. In case the data item was requested within a transaction for the first time, the server provides in step 502 together with the data item the actually valid version number of the tree.

Using the principles discussed for example with respect to FIG. 2, the client determines the next data item to be requested, requests this next data item in step 504 and provides together with the request its known initial version number $k_{ix}$. This corresponds to step 306 of FIG. 3. Thereupon, the server checks in step 506 corresponding to step 308 of FIG. 3 if $k_{ix}$ has changed in the meantime. If this is not the case, that means that $k_{ix}$ is okay, the method continues in step 508 (step 310) with the provision of the requested data item to the client. Then, the method looks back to step 504, the determination of the next data item to be requested and a respective sending of a request together with the initial version number $k_{ix}$ to the server.

However, in case step 506 returns that $k_{ix}$ is not okay, which means that during the ongoing transaction the content of the relation T has changed, an additional mechanism takes place at the server:

Instead of just returning an error that in the meantime the currently valid version number has changed and is different from the initial version number like in step 408 of FIG. 4, the server checks if a counter associated with the transaction has already reached a maximum value. For example, with the first attempt to traverse the tree, the counter indicating the number of abortions of this transversal due to mismatches of the version number is set to zero. This may be done by the client or by the server and the counter may be administrated either at the server or at the client. In case the client is administrating the counter, with each request the counter may be transmitted to the server. However, it is also possible that in case of an abortion of transaction, the server may explicitly request the counter from the client such that the amount of data that is transmitted during the normal course of node requests by the client to the server is minimized to the request together with $k_{ix}$. In case in step 510 the server determines that the counter for that transaction has not yet reached a maximum value, the counter is increased in step 512 due to the abortion and the method continues with the provision of an error in step 516 from the server to the client. Thus, step 516 corresponds to step 410 in the example of FIG. 4. After step 516, the method restarts with the requesting of the data item in step 500, as was discussed above.

In case the transaction was aborted by the server several times due to the concurrent bulk insert operations taking place at the server, at a certain point in time the server may determine in step 510 that the counter has reached a maximum value. The maximum value may be a predefined value. In case the counter has reached the maximum value, after step 510 the counter may be reset and a read override flag is set to the relation T in step 514. The read override flag will then block any new data operations on the data items of the relation T involving any modification of the tree like for example modification of individual nodes or even inserting of new nodes into the tree.

The read override flag then permits the client to restart the transaction and to complete the transaction, i.e. to read the desired data from the database. After the client has completed the operation on the database, the read override flag is released and the bulk insert operation can continue.

It has to be noted that the read override flag does not necessarily have to be applied to the complete relation T, i.e. to all nodes of the tree that is for example depicted in FIG. 1. In case in step 510 it is determined that the counter has reached its maximum value, the read override flag may only be applied to a subset of the data items. For example, in case in FIG. 1 it is known that the read operation will take place on the nodes on the right side below the root node, i.e. on nodes 132-188, the read override flag may only be set to the sub-tree involving said nodes 132-188. Any modifications of the left side of the tree (nodes 80-97) may still be allowed.

Further, it may be possible to subsequently release the read override flag during traversal of the tree in the course of the retrieving of the desired data item: during the traversal of the tree the read override flag may be subsequently released for any data items (nodes) of the tree that are not subject to the traversal. In the above example, in FIG. 1 the traversal may be from node 100 to node 142. Thus, node 90 and any nodes hanging below node 90 are not affected by the traversal, such that for these nodes the read override flag may be released. After traversing from node 142 to node 138, the read override flag may be released for any nodes hanging on the right hand side below node 142, i.e. for node 163 and node 188. Assuming, that the transversal will then be from node 138 to node 140, the read override flag for any nodes hanging on the left hand side below node 138 may be released, i.e. the read override flag may be released for nodes 132, 135 and 136.

In the above example, the counter was administrated at the server. However, it is also possible to administrate the counter at the client. In this case, step 516 follows immediately after step 506 after it was determined that $k_{ix}$ has changed in the meantime. Then, after step 516 steps 510 and 512 are performed by the client. In case the counter has reached the maximum value, after step 510 the counter may again be reset and the server is instructed by the client to set the read override flag to the relation T, which is then performed by the server in step 514. After having instructed the server to set the read override flag, the method continues with step 500.

LIST OF REFERENCE NUMERALS

10 client
12 processor
14 memory
16 storage medium
17 application
18 key
19 request
20 second relation
22 server
24 cache
26 processor
28 memory
30 database
32 first relation
80-188 nodes

The invention claimed is:

1. A method for querying a database stored on a server via a network, the server being coupled to the client computer via the network, wherein the database comprises a relation, the relation comprising data items, the data items forming a partially ordered set in the relation, the method comprising receiving at the client a request for a data operation on a desired data item, the method comprising
   a. determining as an initial version number associated with all of the data items a currently valid version number associated with all of the data items,
   b. traversing, starting from an initial data item of the data items, the relation by repeatedly requesting by the client current data items from the database in order with respect to the partial order until a position of the desired data item or the desired data item itself is identified in the partially ordered set,
      wherein for each requesting, a currently valid version number of the data items of the partially ordered set is determined and compared with the initial version number, the traversing being aborted in case the currently valid version number in any of the requestings is different from the initial version number,
   c. in case the traversing was completed, performing the data operation on an identified position of the desired data item or the desired data item itself,
   d. upon performing the data operation updating the currently valid version number to a new version number.

2. The method of claim 1, the determining of the initial version number of the data items comprising requesting an initial data item by the client, and receiving in response the initial data item and as the initial version number the currently valid version number of the data items.

3. The method of claim 1,
the requesting further comprising transmitting the initial version number from the client to the server and receiving the transmitted initial version number by the server,
the determining if the currently valid version number is different from the initial version number being performed by the server and comprises by the server comparing the transmitted initial version number with the currently valid version number,
the aborting of the traversing being performed by the server.

4. The method of claim 3, the current data items being requested from the database individually or in subsets of current data items, the transmitting of the initial version number from the client to the server being performed with each request.

5. The method of claim 1, wherein steps a.-b. are repeated in case the traversing was aborted, the method further comprising notifying the aborting to the client, the client in response to the notifying initiating the repetition of the steps a.-b.

6. The method of claim 1, the updating of the currently valid version number to the new version number comprising an incrementing of the currently valid version number.

7. The method of claim 1, the request for the data operation on the desired data item comprising anyone of
a read request of the desired data item,
a request for a modification of the desired data item,
a request for inserting the desired data item into the partially ordered set, the position of the desired data item being the position in the partial ordered set at which the desired data item is to be inserted.

8. The method of claim 7, wherein in case the request for the data operation on the desired data item comprises the request for inserting or modification, the performing of the data operation comprises inserting the desired data item into the partially ordered set or modifying the desired data item, the inserting and/or the modifying being implemented at the server as stored procedures.

9. The method of claim 1, wherein steps a.-b. are repeated in case the traversing was aborted, wherein in case the data operation is a read request and for that read request the number of abortions of the traversing exceeds a predetermined threshold, the method further comprises
providing a read override flag to the partially ordered set, the read override flag blocking any new data operations on the data items involving a modification of at least a subset of the data items or an inserting of a further data item into the subset of the data items,
releasing the read override flag after the data operation on the identified position of the desired data item or the desired data item itself was completed.

10. The method of claim 9, the subset of the data items comprising the traversed data items.

11. The method of claim 1, wherein the data items are encrypted with a cryptographic key in the relation, the partial order being formed with respect to the data items in non-encrypted form, the requesting and receiving by the client of the current data items from the database in order with respect to the partial order comprising by the client
receiving the current data item,
decrypting the current data item,
providing a request for a new current data item to the database, the request comprising information that the new current data item is to be retrieved from a position in the partial order succeeding or preceding the position of the current data item, depending if the position of the desired data item in the partial order is preceding or succeeding the position of the decrypted current data item.

12. The method of claim 11, wherein in case the request for the data operation on the desired data item comprises the request for inserting, the performing of the data operation comprises inserting the desired data item into the partially ordered set in encrypted form, the encryption being performed using the cryptographic key.

13. The method of claim 1, wherein in the relation the data items form the partial ordered set via a rooted tree, the initial data item being the data item stored at a root of said tree.

14. A method for querying by a client a database stored on a server via a network, the server being coupled to the client computer via the network, wherein the database comprises a relation, the relation comprising data items, the data items forming a partially ordered set in the relation the method comprising receiving at the client a request for a data operation on a desired data item, the method comprising
a. receiving as an initial version number associated with all of the data items a currently valid version number associated with all of the data items from the server,
b. traversing, starting from an initial data item of the data items, the relation by repeatedly requesting by the client current data items from the database in order with respect to the partial order until the position of the desired data item or a desired data item itself is identified in the partially ordered set,
wherein for each requesting, the initial version number is transmitted from the client to the server,
wherein in response to each requesting, either the current data item or a notification of an aborting is received from the server, the aborting being the result that a currently valid version number is different from the initial version number in any of the requestings,
c. in case the traversing was completed, performing the data operation on an identified position of the desired data item or the desired data item itself.

15. A method for querying a database stored on a server via a network, the server being coupled to the client computer via the network wherein the database comprises a relation, the relation comprising data items, the data items forming a partially ordered set in the relation, the method comprising by the server
a. determining as an initial version number associated with all of the data items a currently valid version number associated with all of the data items, and transmitting the initial version number to the client,
b. repeatedly receiving requests for the data items from the client, the re-quests comprising the initial version number, wherein for each request a currently valid version number of the data items of the partially ordered set is determined and compared with the initial version number, and providing in response to the requests the requested data items to the client in case the currently valid version number matches a received initial version number, the providing being aborted in case the currently valid version number in any of the requests is different from the received initial version number.

16. A system for querying a database stored on a server via a network, the system comprising a client and the server, the server being coupled to the client computer via the network, wherein the database comprises a relation, the relation comprising data items, the data items forming a partially ordered set in the relation, the client being adapted for receiving a request for a data operation on a desired data item, the system being adapted for
- a. determining as an initial version number associated with all of the data items a currently valid version number associated with all of the data items,
- b. traversing, starting from an initial data item of the data items, the relation by repeatedly requesting by the client current data items from the database in order with respect to the partial order until a position of the desired data item or a desired data item itself is identified in the partially ordered set,
  - wherein for each requesting, a currently valid version number of the data items of the partially ordered set is determined and compared with the initial version number, the traversing being aborted in case the currently valid version number is different from the initial version number in any of the requestings,
- c. in case the traversing was completed, performing the data operation on an identified position of the desired data item or the desired data item itself,
- d. upon performing the data operation updating the currently valid version number to a new version number.

17. A client computer for querying a database stored on a server via a network, the server being coupled to the client computer via the network, wherein the database comprises a relation, the relation comprising data items, the data items forming a partially ordered set in the relation, the client being adapted to receiving at the client request for a data operation on a desired data item, the client being adapted for
- a. receiving as an initial version number associated with all of the data items a currently valid version number associated with all of the data items from the server,
- b. traversing, starting from an initial data item of the data items, the relation by repeatedly requesting by the client current data items from the database in order with respect to the partial order until a position of the desired data item or a desired data item itself is identified in the partially ordered set,
  - wherein for each requesting, the initial version number is transmitted from the client to the server,
  - wherein in response to each requesting, either a current data item or a notification of an aborting is received from the server, the aborting being the result that a currently valid version number is different from the initial version number in any of the requestings,
- c. in case the traversing was completed, performing the data operation on an identified position of the desired data item or the desired data item itself.

18. A server computer comprising a database, the server being coupled to a client computer via a network, wherein the database comprises a relation, the relation comprising data items, the data items forming a partially ordered set in the relation, the server being adapted for
- a. determining as an initial version number associated with all of the data items a currently valid version number associated with all of the data items, and transmitting the initial version number to the client,
- b. repeatedly receiving requests for the data items from the client, the requests comprising the initial version number, wherein for each request a currently valid version number of the data items of the partially ordered set is determined and compared with the initial version number, and providing in response to the requests the requested data items to the client in case the currently valid version number matches the received initial version number, the providing being aborted in case the currently valid version number is different from the received initial version number in any of the requests.

* * * * *